United States Patent
Sugeno et al.

(10) Patent No.: US 10,349,094 B2
(45) Date of Patent: Jul. 9, 2019

(54) VIDEO TRANSMISSION APPARATUS, VIDEO RECEPTION APPARATUS, VIDEO TRANSMISSION METHOD, AND VIDEO TRANSMISSION SYSTEM

(71) Applicant: SONY CORPORATION, Tokyo (JP)

(72) Inventors: Kazuhiro Sugeno, Kanagawa (JP); Koji Kamiya, Kanagawa (JP); Yasutaka Nakashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/559,971

(22) PCT Filed: Feb. 25, 2016

(86) PCT No.: PCT/JP2016/001008
§ 371 (c)(1),
(2) Date: Sep. 20, 2017

(87) PCT Pub. No.: WO2016/157706
PCT Pub. Date: Oct. 6, 2016

(65) Prior Publication Data
US 2018/0077434 A1    Mar. 15, 2018

(30) Foreign Application Priority Data
Mar. 30, 2015   (JP) ................................. 2015-070205

(51) Int. Cl.
*H04N 9/77* (2006.01)
*H04N 19/00* (2014.01)
(Continued)

(52) U.S. Cl.
CPC ........... *H04N 21/2343* (2013.01); *H04N 9/77* (2013.01); *H04N 19/00* (2013.01); *H04N 19/186* (2014.11);
(Continued)

(58) Field of Classification Search
CPC ............... H04N 19/00; H04N 21/2343; H04N 21/2385; H04N 21/2662; H04N 21/4854; H04N 9/77; H04N 21/43635
See application file for complete search history.

(56) References Cited

U.S. PATENT DOCUMENTS 6,784,940 B1    8/2004  Takazawa et al.
8,842,193 B2 *  9/2014  Nishida ................ H04N 5/2258
                                                    348/222.1
(Continued)

FOREIGN PATENT DOCUMENTS

DE     69935304 T2    10/2007
EP     1014706 A2     6/2000
(Continued)

OTHER PUBLICATIONS

International Search Report and Written Opinion of PCT Application No. PCT/JP2016/001008, dated May 10, 2016, 06 pages of ISRWO.

*Primary Examiner* — Hai V Tran
(74) *Attorney, Agent, or Firm* — Chip Law Group

(57) ABSTRACT

This video transmission apparatus includes: a first control unit that divides video data into a plurality of channels in units of one or more specified number of consecutive frames, and gives a change by a reversible method to the video data of a specific area in the frame of the video data of each channel, the specific area corresponding to the channel; and a plurality of first video transmission interfaces that each transmit the video data of each channel to which the change is given.

12 Claims, 14 Drawing Sheets

(51) Int. Cl.
*H04N 19/186* (2014.01)
*H04N 21/485* (2011.01)
*H04N 21/2343* (2011.01)
*H04N 21/2385* (2011.01)
*H04N 21/2662* (2011.01)
*H04N 21/4402* (2011.01)

(52) U.S. Cl.
CPC ..... *H04N 21/2385* (2013.01); *H04N 21/2662* (2013.01); *H04N 21/4402* (2013.01); *H04N 21/4854* (2013.01)

(56) References Cited

U.S. PATENT DOCUMENTS

2010/0157090 A1* 6/2010 Kobayashi ............... H04N 5/77
348/222.1
2013/0216235 A1* 8/2013 Ishida .................... H04B 15/04
398/130
2014/0362295 A1 12/2014 Suzuki

FOREIGN PATENT DOCUMENTS

| | | | |
|---|---|---|---|
| EP | 1596585 | A3 | 3/2006 |
| JP | 2000-188703 | A | 7/2000 |
| JP | 2010-278481 | A | 12/2010 |
| JP | 2013-138348 | A | 7/2013 |
| KR | 10-2000-0048328 | A | 7/2000 |
| WO | 2013/099369 | A1 | 7/2013 |

* cited by examiner

Changed video of transmission channel 1

A1

Changed video of transmission channel 2

A1   A2

Changed video of transmission channel 3

A1  A2  A3

Restored video of reception channel 1

A2

Restored video of reception channel 2

A2

Restored video of reception channel 3

Restored video of reception channel 2

A3

Restored video of reception channel 3

A3

Restored video of reception channel 1

Restored video of reception channel 3

Restored video of reception channel 1

Restored video of reception channel 2

VIDEO TRANSMISSION APPARATUS, VIDEO RECEPTION APPARATUS, VIDEO TRANSMISSION METHOD, AND VIDEO TRANSMISSION SYSTEM

CROSS REFERENCE TO RELATED APPLICATIONS

This application is a U.S. National Phase of International Patent Application No. PCT/JP2016/001008 filed on Feb. 25, 2016, which claims priority benefit of Japanese Patent Application No. JP 2015-070205 filed in the Japan Patent Office on Mar. 30, 2015. Each of the above-referenced applications is hereby incorporated herein by reference in its entirety.

TECHNICAL FIELD

The present technology relates to a video transmission apparatus, a video reception apparatus, a video transmission method, and a video transmission system, and particularly to a video transmission apparatus, a video reception apparatus, a video transmission method, and a video transmission system that are used for dividing video data into a plurality of channels in units of one or more specified number of consecutive frames and transmitting the video data of each channel using a plurality of video transmission interfaces.

BACKGROUND ART

In recent years, for realizing slow motion reproduction of video data, high-speed cameras capable of shooting at a high frame rate such as hundreds of frames per second that far exceeds the frame rate of a typical camera (24 frames per second, 30 frames per second) are appearing.

For example, Patent Literature 1 discloses a technology related to a data processing apparatus that captures data on high-speed video taken by a high-speed camera, performs signal processing, and performs slow motion reproduction. This data processing apparatus divides the data on high-speed video taken by the high-speed camera in units of n frames and stores the divided frames in a data storage means. The data processing apparatus reads the frame from the data storage means, compresses and encodes the frame, and records it in the data storage means as stream data. The stream data recorded in the data storage means is decoded by a decoding means in the data processing apparatus and supplied to a display apparatus for display. In accordance with this data processing apparatus disclosed in Patent Literature 1, the effect that high-performance processing means is not required by dividing a camera output signal by separate frames and processing it, as compared with a case where a series of processing is performed by directly receiving a camera output signal, is indicated.

CITATION LIST

Patent Literature

Patent Literature 1: Japanese Patent Application Laid-open No. 2010-278481

DISCLOSURE OF INVENTION

Technical Problem

In order to transmit video data of a high frame rate of several hundred frames per second using a standard interface for studio such as 3G-SDI (3G Serial Digital Interface) and HD-SDI (High Definition Serial Digital Interface), the above-mentioned video data of a high frame rate is distributed to a plurality of channels and the video data of each channel is transmitted using a plurality of standard interfaces. In accordance with this method, by increasing the number of channels, it is possible to transmit video data of a higher frame rate using a plurality of standard interfaces.

However, various problems to be improved such as functional deficiencies and performance deficiencies still remain in this transmission method.

In view of the circumstances as described above, it is an object of the present technology to provide a video transmission apparatus, a video reception apparatus, a video transmission method, a video transmission method, and a video transmission system that are capable of improving the problem in the case of dividing video data into a plurality of channels in units of one or more specified number of consecutive frames and transmitting the video data of each channel using a plurality of video transmission interfaces.

Solution to Problem

In order to solve the above-mentioned problem, a video transmission apparatus according to the present technology includes: a first control unit that divides video data into a plurality of channels in units of one or more specified number of consecutive frames, and gives a change by a reversible method to the video data of a specific area in the frame of the video data of each channel, the specific area corresponding to the channel; and a plurality of first video transmission interfaces that each transmit the video data of each channel to which the change is given.

The first control unit may be configured to divide the video data of a first frame rate into a plurality of channels in units of one or more specified number of consecutive frames, and cause the plurality of first video transmission interfaces to transmit the video data of each channel to which the change is given at a second frame rate obtained by dividing the first frame rate by the number of the channels.

The plurality of first video transmission interfaces may be each configured to transmit the video data of each channel to a reception apparatus as a transmission destination via each of a plurality of cables.

The first control unit may be configured to give the change by the reversible method to the video data of the specific area by replacing a value of a brightness component and a value of a color component in the video data of the specific area with each other.

The first control unit may be configured to give the change by the reversible method to the video data of the specific area by inverting a value of a specific bit of one or more digits of a word indicating a value of a brightness component in the video data of the specific area.

The first control unit may be configured to calculate, by replacing a value of a brightness component and a value of a color component of a pixel of one or more specific areas in the video data of the specific area with each other, a difference between an original value of the pixel and the replaced value of the pixel, give, where the difference exceeds a specific threshold value, the change by the reversible method to the video data of the specific area by replacing a value of a brightness component and a value of a color component in the video data of the specific area with each other, and give, where the difference does not exceed the specific threshold value, the change by the reversible method to the video data of the specific area by inverting a value of a specific bit of one or more digits of a word indicating the value of the brightness component in the video data of the specific area.

The first control unit may be configured to give a change to the video data of the specific area, the number of specific areas corresponding to the channel.

The first control unit may be configured to give a change to the video data of the specific area at a position corresponding to the channel.

The first control unit may be configured to give a change to the video data of the specific area having a shape corresponding to the channel.

A video reception apparatus according to the present technology includes:

a plurality of second video transmission interfaces that each receive, from a video transmission apparatus including a first control unit that divides video data into a plurality of channels in units of one or more specified number of consecutive frames, and gives a change by a reversible method to the video data of a specific area in the frame of the video data of each channel, the specific area corresponding to the channel, and a plurality of first video transmission interfaces that each transmit the video data of each channel to which the change is given, the video data of each channel; and a second control unit that
  allocates channels to the plurality of second video transmission interfaces, and
  performs, on the video data of each channel received by the plurality of second video transmission interfaces, restoration processing for restoring the video data of the specific area to the video data before the change, the restoration processing corresponding to the channel allocated to the second video transmission interface that has received the video data.

A video transmission method according to the present technology includes:
  dividing, by a first control unit, video data into a plurality of channels in units of one or more specified number of consecutive frames;
  giving, by the first control unit, a change by a reversible method to the video data of a specific area in the frame of the video data of each channel, the specific area corresponding to the channel; and
  transmitting, by a plurality of first video transmission interfaces, the video data of each channel to which the change is given.

A video transmission method according to the present technology includes:
  dividing, by a first control unit of a video transmission apparatus, video data into a plurality of channels in units of one or more specified number of consecutive frames;
  giving, by the first control unit, a change by a reversible method to the video data of a specific area in the frame of the video data of each channel, the specific area corresponding to the channel;
  transmitting, by a plurality of first video transmission interfaces, the video data of each channel to which the change is given;
  allocating, by a second control unit of the video transmission unit, channels to the plurality of second video transmission interfaces, and
  performing, by the second control unit, on the video data of each channel received by the plurality of second video transmission interfaces, restoration processing for restoring the video data of the specific area to the video data before the change, the restoration processing corresponding to the channel allocated to the second video transmission interface that has received the video data.

A video transmission system according to the present technology includes:
  a video transmission apparatus including
    a first control unit that
      divides video data into a plurality of channels in units of one or more specified number of consecutive frames, and
      gives a change by a reversible method to the video data of a specific area in the frame of the video data of each channel, the specific area corresponding to the channel, and
    a plurality of first video transmission interfaces that each transmit the video data of each channel to which the change is given; and
  a video reception apparatus including
    a plurality of second video transmission interfaces that each receive the video data of each channel transmitted from the video transmission apparatus, and
    a second control unit that
      allocates channels to the plurality of second video transmission interfaces, and
      performs, on the video data of each channel received by the plurality of second video transmission interfaces, restoration processing for restoring the video data of the specific area to the video data before the change, the restoration processing corresponding to the channel allocated to the second video transmission interface that has received the video data.

Advantageous Effects of Invention

As described above, in accordance with the present technology, the problem in the case of dividing video data into a plurality of channels in units of one or more specified number of consecutive frames and transmitting the video data of each channel using a plurality of video transmission interfaces is improved. It should be noted that the effect described here is not necessarily limitative and may be any effect described in the present disclosure.

MODE(S) FOR CARRYING OUT THE INVENTION

Hereinafter, embodiments of the present technology will be described with reference to the drawings.

First Embodiment

[Video Transmission System]

Figure 1:
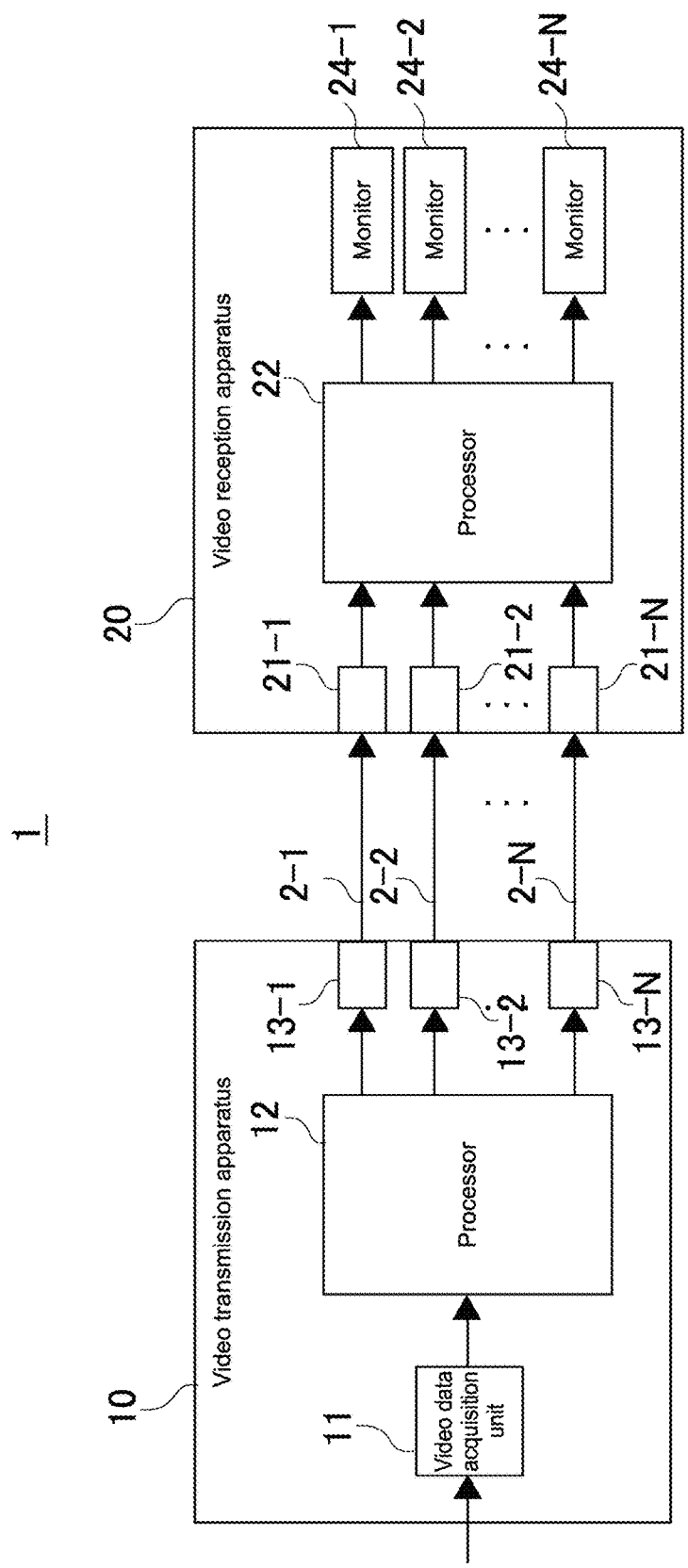
FIG. 1 is a diagram showing a configuration of a video transmission system 1 according to a first embodiment of the present technology.

FIG. 1 is a diagram showing a configuration of a video transmission system 1 according to a first embodiment of the present technology.

As shown in the figure, this video transmission system 1 includes a video transmission apparatus 10 that transmits video data, a video reception apparatus 20 that receives video data, and a transmission path 30 that transmissions video data from the video transmission apparatus 10 to the video reception apparatus 20.

[Video Transmission Apparatus 10]

The video transmission apparatus 10 includes a video data acquisition unit 11, a processor 12 (first control unit), and N video transmission interfaces 13-1, 13-2, . . . , and 13-N (first video transmission interfaces).

The video data acquisition unit 11 acquires video data of a first frame rate. The video data acquisition unit 11 may be an imaging unit including an image sensor such as a CMOS (Complementary Metal Oxide) image sensor, and an optical lens for forming an image of subject light on an imaging surface of the image sensor, and the like. In the case of having such an imaging unit, the video transmission apparatus is configured as an imaging apparatus. Alternatively, the video data acquisition unit 11 may acquire the transmitted video data of the first frame rate from an external imaging apparatus.

The video transmission interfaces 13-1, 13-2, . . . , and 13-N are each an interface capable of transmitting video data at a second frame rate of 1/N of the first frame rate. The first frame rate may be, for example, a high frame rate such as 180 frames per second, and the second frame rate may be, for example, a frame rate of a standard serial digital interface for studio such as 60 frames per second that is ⅓ of the first frame rate. The N video transmission interfaces 13-1, 13-2, . . . , and 13-N are provided in the video transmission apparatus 10. For example, in the case where the first frame rate is 180 frames per second and the second frame rate is 60 frames per second as described above, three video transmission interfaces 13-1, 13-2, and 13-3 are used. By using three video transmission interfaces 13-1, 13-2, and 13-3 capable of transmitting video data at 60 frames per second as described above, video data of 180 frames per second can be transmitted. Note that in the present technology, N is not less than 2.

The processor 12 includes, for example, a CPU (Central Processing Unit) and a memory for storing a program executed by this CPU and the like. The processor 12 performs, for example, the following operation on the basis of the program stored in the memory.

The processor 12 distributes the video data of the first frame rate acquired by the video data acquisition unit 11 to N channels one frame at a time in the order of frame number. Note that at this time, the video data may be distributed to N channels in units of a plurality of consecutive frames.

Figure 2:
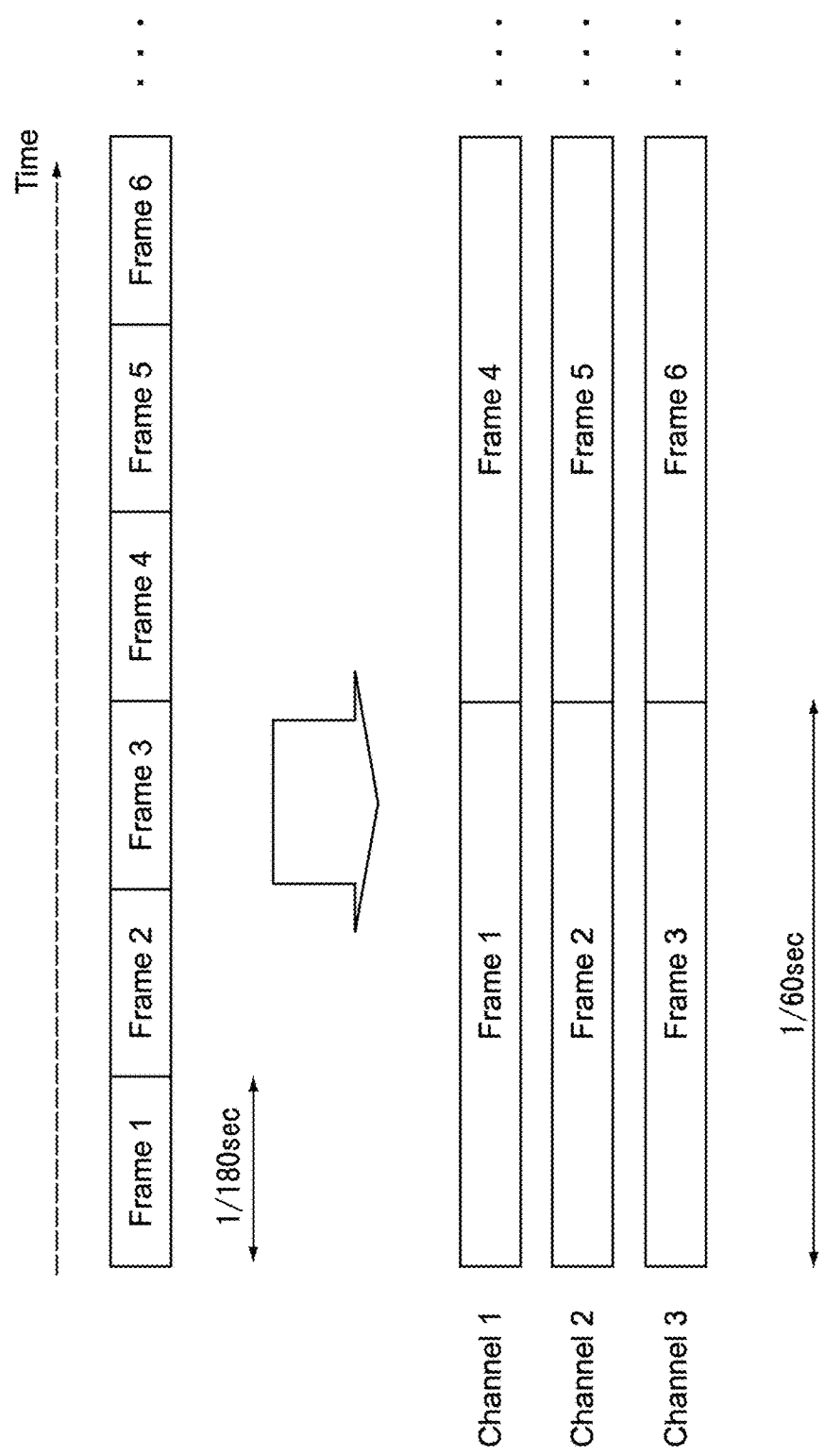
FIG. 2 is a diagram showing a case where video data of 180 frames per second is distributed to three channels one frame at a time in the order of frame number and transmitted at 60 frames per second.

FIG. 2 is a diagram showing a case where video data of 180 frames per second (first frame rate) is distributed to three channels one frame at a time in the order of frame number and transmitted at 60 frames per second (second frame rate).

The processor 12 performs control so that the video data distributed to N channels is transmitted in parallel by the N video transmission interfaces 13-1, 13-2, . . . , and 13-N. At this time, the processor 12 allocates channel numbers to the N video transmission interfaces 13-1, 13-2, . . . , and 13-N, and performs control so that the video data of each channel is transmitted in parallel using the video transmission interfaces 13-1, 13-2, . . . , and 13-N to which the corresponding channel numbers is allocated.

Further, for example, when receiving a connection confirmation instruction from a user, with respect to the video data of each channel, the processor 12 gives a change by a reversible method to video data of the specific area corresponding to the channel in the frame. This change by the reversible method is performed by, for example, changing the position, the number, and the like of the specific area in the frame to which the change is to be given for each channel. Alternatively, the reversible method itself may be changed depending on the channel.

Then, the processor 12 performs control so that the video data of N channel to which the change is given is transmitted in parallel by the N video transmission interfaces 13-1, 13-2, . . . , and 13-N.

Note that the change by the reversible method for the video data of the specific area may be performed only while the connection confirmation instruction is issued, or constantly, i.e., continuously while video data is being transmitted.

Further, when the connection confirmation instruction is issued, the processor 12 may generate a color bar signal, divide this color bar signal into N channels, and change, for each channel, video data of the specific area corresponding to the channel by a reversible method.

[Video Reception Apparatus 20]

As shown in FIG. 1, the video reception apparatus 20 includes N video transmission interfaces 21-1, 21-2, . . . , and 21-N (second video transmission interfaces), a processor 22 (second control unit), and monitors 24-1, 24-2, . . . , and 24-N. Note that the monitors 24-1, 24-2, . . . , and 24-N may be monitors outside the video reception apparatus 20.

The N video transmission interfaces 21-1, 21-2, . . . , and 21-N are interfaces associated one-to-one with the N video transmission interface 13-1, 13-2, . . . , and 13-N of the video transmission apparatus 10.

The processor 22 allocates channel numbers to the N video transmission interfaces 21-1, 21-2, . . . , and 21-N, and processes the video data of each channel transmitted from the video transmission apparatus 10 as the video data of the channel allocated to a video transmission interface that has received the video data out of the video transmission interfaces 21-1, 21-2, . . . , and 21-N.

The processor 22 includes, for example, a CPU (Central Processing Unit) and a memory for storing a program executed by this CPU and the like. The processor 22 performs, for example, the following operation on the basis of the program stored in the memory.

For example, when receiving a connection confirmation instruction from a user, with respect to the video data of each channel received by the N video transmission interfaces 21-1, 21-2, . . . , and 21-N, the processor 22 performs restoration processing depending on the reception channel for restoring the video data of the specific area in the frame to which the change by the reversible method is given, to the video data before the change. Note that the reception channel means a channel allocated to a video transmission interface that has received the video data out of the video transmission interfaces 21-1, 21-2, . . . , and 21-N.

Note that the restoration processing for the video data of the specific area may be performed only while the connection confirmation instruction is issued, or constantly, i.e., continuously while video data is being transmitted.

The processor 22 outputs the video data of each channel subjected to the restoration processing to the monitors 24-1, 24-2, . . . , and 24-N. Note that the number of monitors may be one. In this case, the video data of each channel may be reduced by down-converting or the like so that the video data of all the channels is displayed on the screen of one monitor. Alternatively, video data of each channel may be displayed in order in response to a display channel switching instruction input from a user.

N cable connectors (not shown) corresponding to the N video transmission interfaces 13-1, 13-2, . . . and 13-N of the video transmission apparatus 10 are respectively connected to N cable connectors (not shown) corresponding to the N video transmission interfaces 21-1, 21-2, . . . , and 21-N of the video reception apparatus 20 via cables 2-1, 2-2, . . . , and 2-N.

[Cable Connection Error and its Discoverability]

As described above, in the case where the video transmission apparatus 10 distributes the video data of the first frame rate to N pieces of video data of the second frame rate of 1/N of the first frame rate and transmit the video data of N channels, the N video transmission interfaces 13-1, 13-2, . . . , and 13-N of the video transmission apparatus 10 and the N video transmission interfaces 21-1, 21-2, . . . , and 21-N of the video reception apparatus 20 to which the common channels are allocated need to be connected to each other via the cables 2-1, 2-2, . . . , and 2-N. In the case where there is an error in the cable connection in any one of the channels, when joining the video data of each channel to restoring to one piece of video data of high-speed frame rate (first frame rate), the respective frames are not joined in the correct order. Further, since the difference between frames is smaller as the frame rate of the video is higher, it is difficult to recognize the error in the order of connection of each frame only by watching the joined video data, and discovery of cable connection error may be delayed.

In the video transmission system 1 according to this embodiment, the video transmission apparatus 10 distributes video data to N channels one frame at a time in the order of frame number, and gives, with respect to the distributed video data of each channel, a change by a reversible method to the video data of the specific area depending on the channel in the frame. Meanwhile, the video reception apparatus 20 performs, with respect to the received video data of each channel, restoration processing depending on the reception channel for restoring the video data of the specific area to which the change by the reversible method is given, to the video data before the change. If there is an error in the relationship of cable connection between the N video transmission interfaces 13-1, 13-2, . . . , and 13-N of the video transmission apparatus 10 and the N video transmission interfaces 21-1, 21-2, . . . , and 21-N of the video reception apparatus 20, at least the video data of the specific area to which the change by the reversible method is given in the video data received by the channel in which the connection error has occurred is not correctly restored to the video data before the change. The results of the restoration processing on the video data for each channel are displayed on the monitors 24-1, 24-2, . . . , and 24-N. Accordingly, the user can know, as the channel where the cable connection error occurs, at least the channel on which the video data of the specific area has not been correctly restored to the video data before the change.

[Method of Changing Video Data]

In the following description, a case where a method of giving a change to the video data of a specific area is adopted will be described, the number of specific areas corresponding to the above-mentioned 1. channel.

Figure 3:
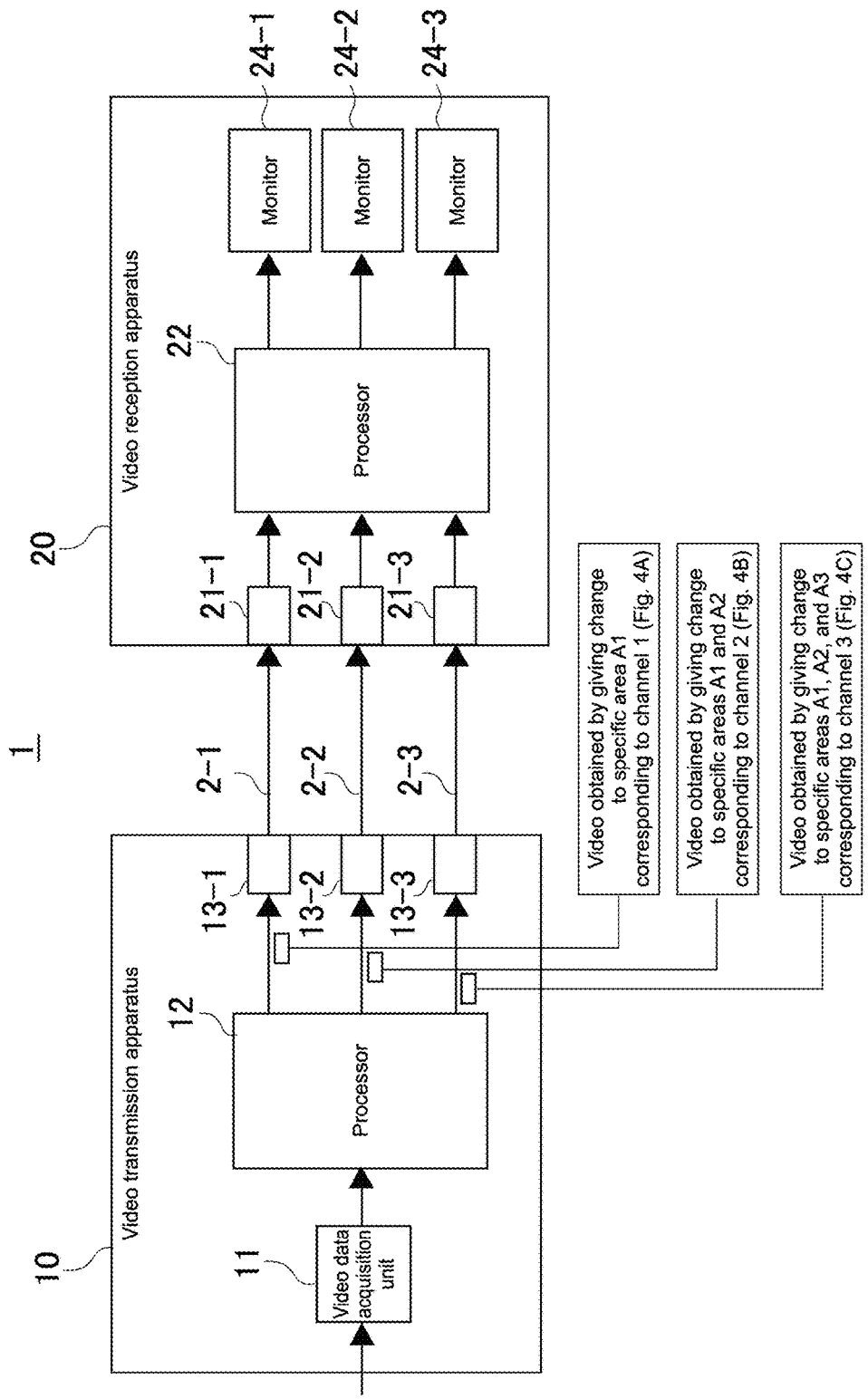
FIG. 3 is a diagram showing an operation in the case where a method of giving a change to video data of a specific area is used in the video transmission system 1 shown in FIG. 1, the number of specific areas corresponding to a channel.
Figure 4A:
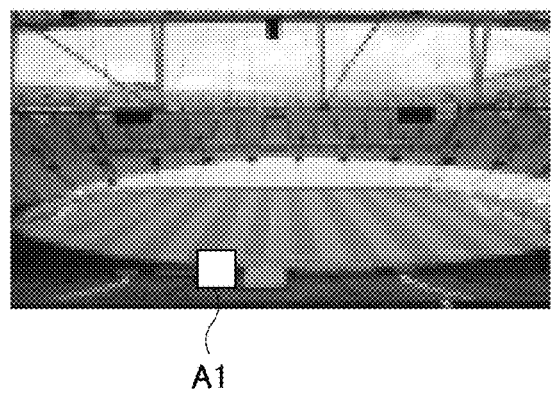
FIG. 4A is a diagram showing an example of video data of a specific area to which a change is given, the number of specific areas corresponding to a channel 1.
Figure 4B:
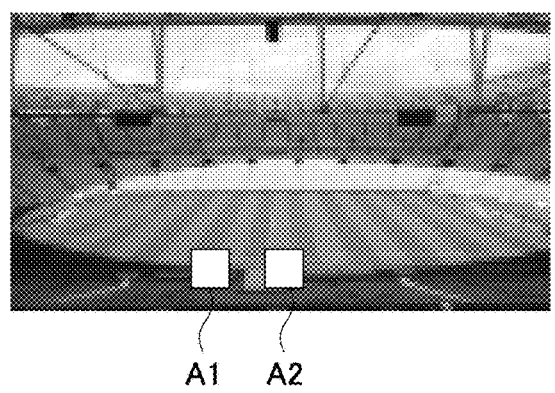
FIG. 4B is a diagram showing an example of video data of a specific area to which a change is given, the number of specific areas corresponding to a channel 2.
Figure 4C:
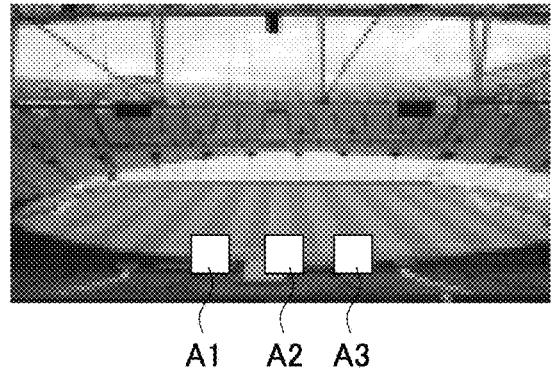
FIG. 4C is a diagram showing an example of video data of a specific area to which a change is given, the number of specific areas corresponding to the channel 2.

FIG. 3 is a diagram showing an operation in the case where a method of giving a change to video data of a specific area is used, the number of specific areas corresponding to a channel. FIG. 4A, FIG. 4B, and FIG. 4C are each a diagram showing an example of video data of a specific area to which a change is given, the number of specific areas corresponding to a channel 1.

In this example, assumption is made that the video data of the first frame rate is divided into video data of the second frame rate of three channels and transmitted. Individual channels in the three channels are referred to as "channel 1", "channel 2", and "channel 3".

Figure 13:
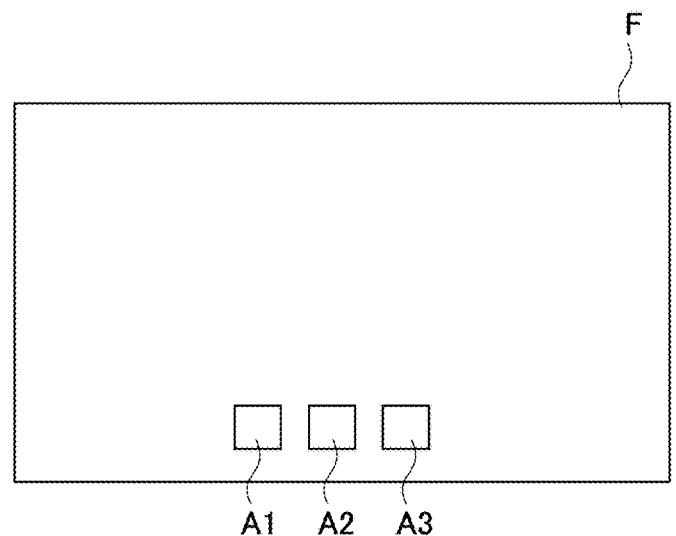
FIG. 13 is a diagram for describing a specific area in a frame.

FIG. 13 is a diagram for describing a specific area in a frame.

As shown in the figure, three specific areas A1, A2, and A3 are set in a frame F in a spatially exclusive positional relationship. Note that the specific area A1 is associated with the channel 1, the two specific areas A1 and A2 are associated with the channel 2, and the three specific areas A1, A2, and A3 are associated with the channel 3. The specific areas A1, A2, and A3 do not necessarily need to have the same size and shape. Further, although it is favorable that the positions of the specific areas A1, A2, and A3 are fixed, they do not necessarily need to be fixed.

As shown in FIG. 4A, the processor 12 of the video transmission apparatus 10 gives, with respect to the video data of the channel 1, a change to the video data of the specific area A1. Similarly, as shown in FIG. 4B, the processor 12 of the video transmission apparatus 10 gives, with respect to the video data of the channel 2, a change to the video data of the two specific areas A1 and A2. Furthermore, as shown in FIG. 4C, the processor 12 of the video transmission apparatus 10 gives, with respect to the video data of the channel 3, a change to the video data of the three specific areas A1, A2, and A3.

The positions of the specific areas A1 to A3 to which a change is given in the frame only need to be positions that do not spatially overlap with each other. The specific area A1 in the video data of the channel 1, the specific area A1 in the video data of the channel 2, and the specific area A1 in the video data of the channel 3 are set to the same position in the frame. Similarly, the specific area A2 in the video data of the channel 2 and the specific area A2 in the video data of the channel 3 are also set to the same position in the frame.

As described above, the video data of the three channels to which a change is given is supplied to the processor 22 of the video reception apparatus 20 by the three video transmission interfaces 13-1, 13-2, and 13-3 of the video transmission apparatus 10 and the three video transmission interfaces 21-1, 21-2, and 21-3 of the video reception apparatus 20 connected to each other via the cables 2-1, 2-2, and 2-3, respectively.

The processor 22 of the video reception apparatus 20 performs, with respect to the video data received by the video transmission interface 21-1 to which the channel 1 is allocated, restoration processing for restoring the video data to which a change corresponding to the channel 1 is given, to the video data before the change. Similarly, the processor 22 of the video reception apparatus 20 performs, with respect to the video data received by the video transmission interface 21-2 to which the channel 2 is allocated, restoration processing for restoring the video data to which a change corresponding to the channel 2 is given, to the video data before the change. Similarly, the processor 22 of the video reception apparatus 20 performs, with respect to the video data received by the video transmission interface 21-3 to which the channel 3 is allocated, restoration processing for restoring the video data to which a change corresponding to the channel 3 is given, to the video data before the change.

Note that in the case where the three video transmission interfaces 13-1, 13-2, and 13-3 of the video transmission apparatus 10 and the three video transmission interfaces 21-1, 21-2, and 21-3 of the video reception apparatus 20 to which the common channels are allocated are connected to each other via the cables 2-1, 2-2, and 2-3, the video data of each channel is restored to the video data before the change by the restoration processing corresponding to the channel for the video data of each channel. This allows the user to confirm that the cable connection of all the channels is correct.

Figure 5:
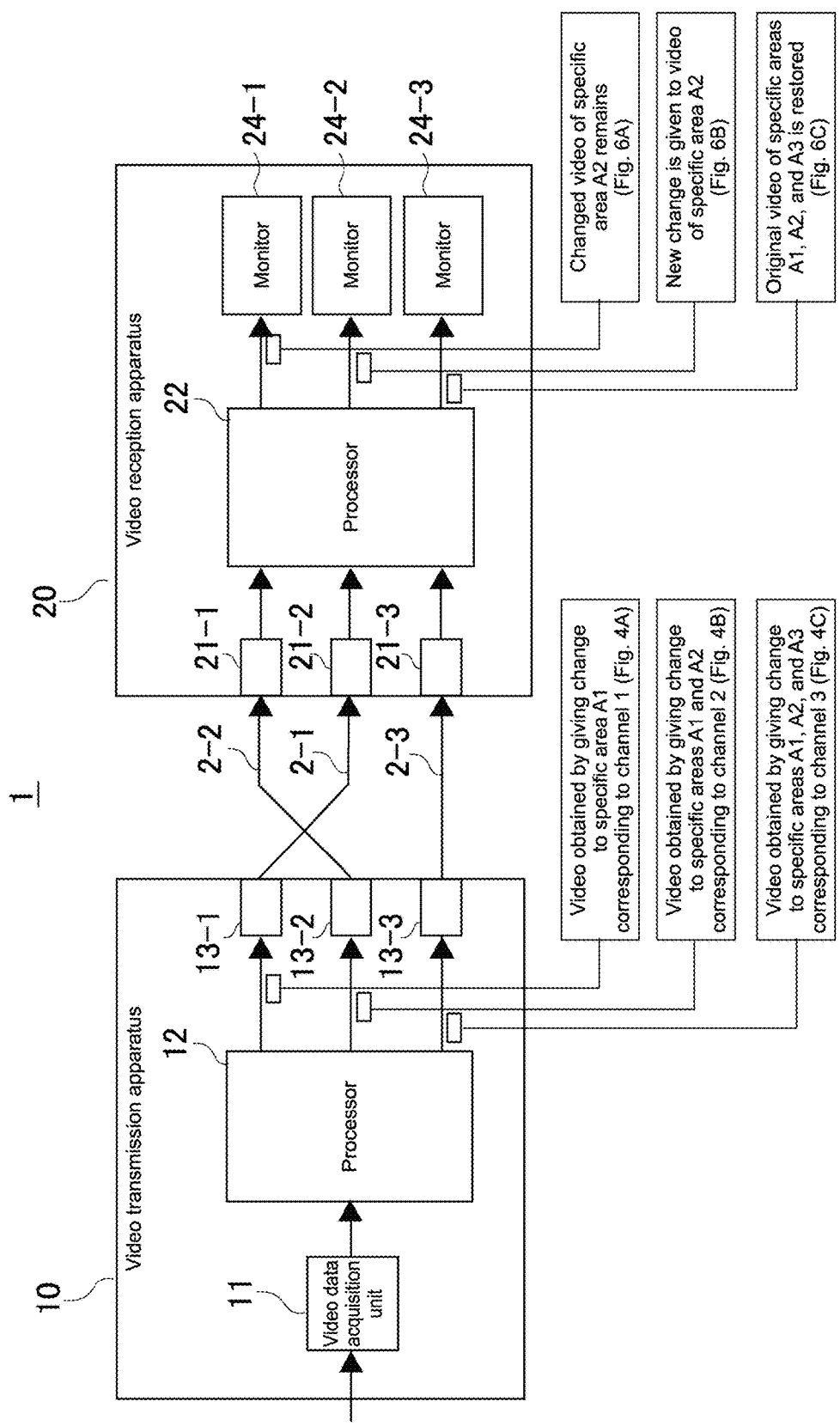
FIG. 5 is a diagram showing a case where the channel 1 and the channel 2 are replaced with each other and connected to each other.

FIG. 5 is a diagram showing a case where the channel 1 and the channel 2 are replaced with each other and connected to each other.

In this case, in the video reception apparatus 20, the video data received by the video transmission interface 21-1 to which the channel 1 is allocated is actually the video data of the channel 2, and the video data received by the video transmission interface 21-2 to which the channel 2 is allocated is actually the video data of the channel 1.

Figure 6A:
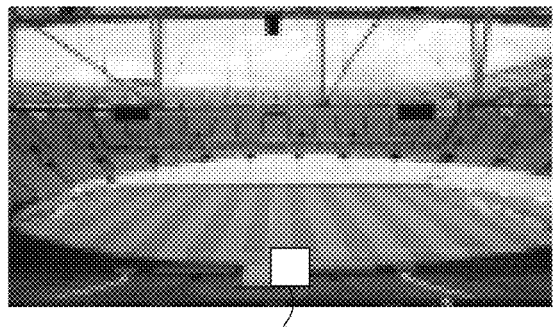
FIG. 6A is a diagram showing restored video of a reception channel 1 in relation to FIG. 5.

For this reason, since the processor 22 of the video reception apparatus 20 actually performs restoration processing for restoring the video data to which the change corresponding to the channel 1 is given to the video data of the channel 2 to the video data before the change, the video data before the change is not correctly restored. More specifically, as shown in FIG. 6A, although the video data of one specific area A1 of the two specific areas A1 and A2 is restored to the video data before the change by the restoration processing in the restored image of the reception channel 1, the video data of the other specific area A2 remains as the changed video. Accordingly, the user can know that the video transmission interface 21-1 to which the channel 1 on the reception side is allocated and the video transmission interface 13-2 to which the channel 2 on the transmission side is allocated are erroneously connected to each other.

Figure 6B:
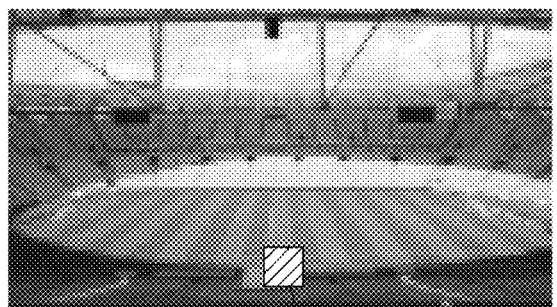
FIG. 6B is a diagram showing restored video of a reception channel 2 in relation to FIG. 5.

Similarly, since the processor 22 of the video reception apparatus 20 actually performs restoration processing for restoring the video data to which the change corresponding to the channel 2 is given to the video data of the channel 1 to the video data before the change, the video data before the change is not correctly restored. More specifically, as shown in FIG. 6B, although the video data of one specific area A1 is restored to the video data before the change by the restoration processing in the restored image of the reception channel 2, a new change is given by restoration processing on the video data of the specific area A2 of the channel 1 that has not been changed. Accordingly, the user can know that the video transmission interface 21-2 to which the channel 2 on the reception side is allocated and the video transmission interface 13-1 to which the channel 1 on the transmission side is allocated are erroneously connected to each other.

Figure 6C:
FIG. 6C is a diagram showing restored video of a reception channel 3 in relation to FIG. 5.

Further, with respect to the video data of the channel 3, since the processor 22 of the video reception apparatus 20 performs the restoration processing for restoring the video data to which the change corresponding to the channel 3 is given, to the video data before the change, all pieces of video data of the three specific areas A1, A2, and A3 are restored to the video data before the change, as shown in FIG. 6C. Accordingly, the user can know that there is no error in the cable connection with respect to the channel 3.

Thus, the user can know that there is an error in the cable connection with respect to the channel 1 and the channel 2.

Figure 7:
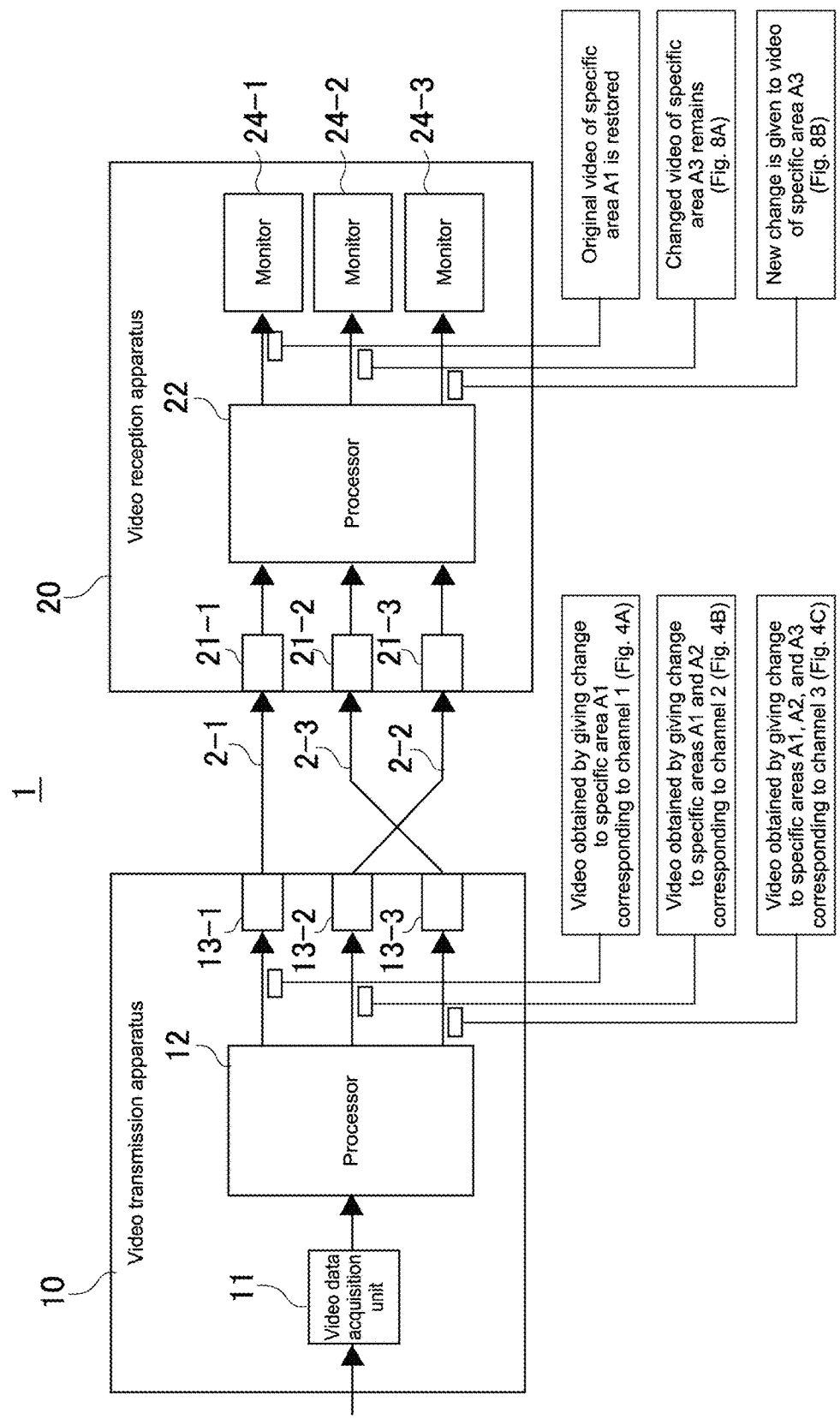
FIG. 7 is a diagram showing a case where the channel 2 and the channel 3 are replaced with each other and connected to each other.

FIG. 7 is a diagram showing a case where the channel 2 and the channel 3 are replaced with each other and connected to each other.

Figure 8A:
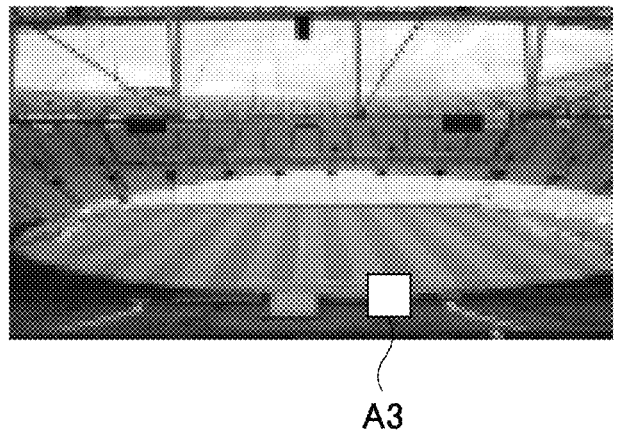
FIG. 8A is a diagram showing restored video of the reception channel 2 in relation to FIG. 7.

In this case, the processor 22 actually performs restoration processing for restoring the video data to which the change corresponding to the channel 2 is given to the video data of the channel 3 to the video data before the change. For this reason, as shown in FIG. 8A, the video data of the specific area A3 remains as the changed video. Accordingly, the user can know that the video transmission interface 21-2 to which the channel 2 on the reception side is allocated and the video transmission interface 13-3 to which the channel 3 on the transmission side is allocated are erroneously connected to each other.

Figure 8B:
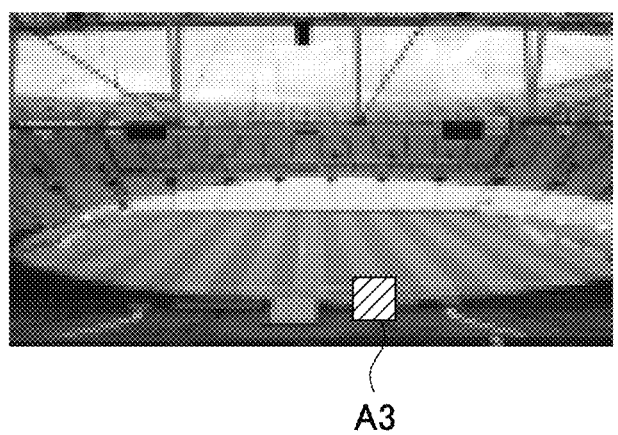
FIG. 8B is a diagram showing restored video of the reception channel 3 in relation to FIG. 7.

Further, since the processor 22 actually performs the restoration processing for restoring the video data to which the change corresponding to the channel 3 is given to the video data of the channel 2, to the video data before the change, a new change is given by restoration processing on the video data of the specific area A3 of the channel 2 that has not been changed as shown in FIG. 8B. Accordingly, the user can know that the video transmission interface 21-3 to which the channel 3 on the reception side is allocated and the video transmission interface 13-2 to which the channel 2 on the transmission side is allocated are erroneously connected to each other.

Figure 9:
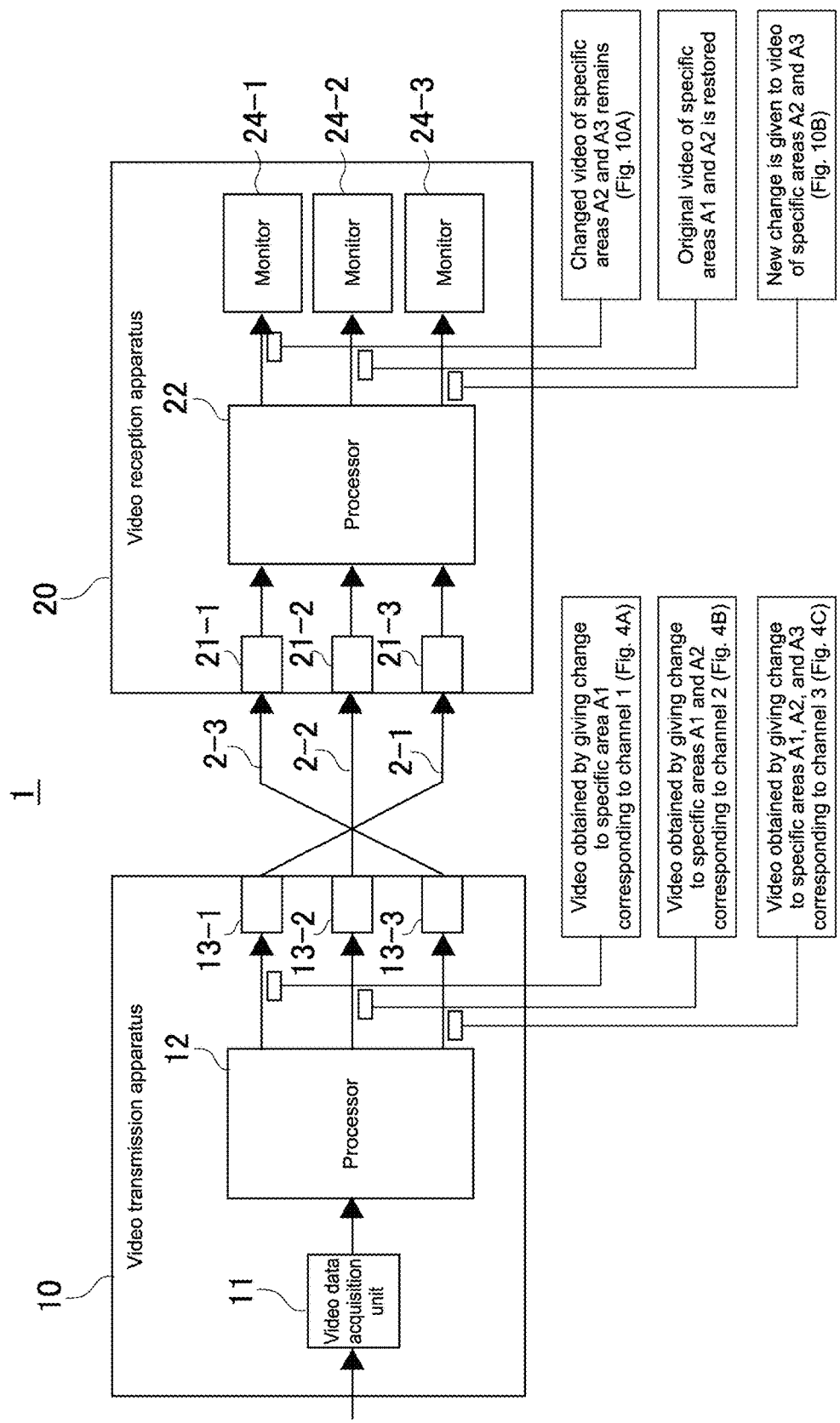
FIG. 9 is a diagram showing a case where the channel 1 and the channel 3 are replaced with each other and connected to each other.

FIG. 9 is a diagram showing a case where the channel 1 and the channel 3 are replaced with each other and connected to each other.

Figure 10A:
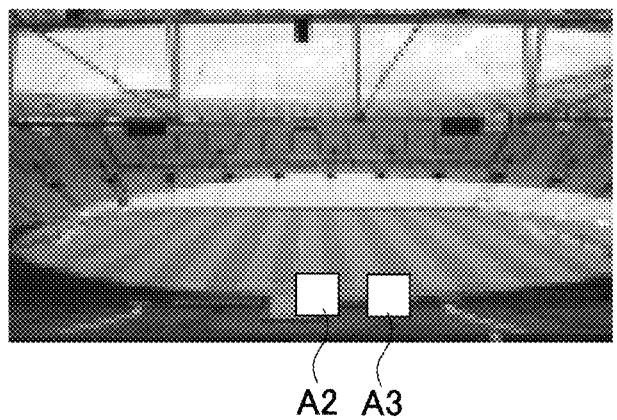
FIG. 10A is a diagram showing restored video of the reception channel 1 in relation to FIG. 9.

In this case, the processor 22 actually performs restoration processing for restoring the video data to which the change corresponding to the channel 1 is given to the video data of the channel 3 to the video data before the change. For this reason, as shown in FIG. 10A, the video data of the specific areas A2 and A3 remains as the changed video. Accordingly, the user can know that the video transmission interface 21-1 to which the channel 1 on the reception side is allocated and the video transmission interface 13-3 to which the channel 3 on the transmission side is allocated are erroneously connected to each other.

Figure 10B:
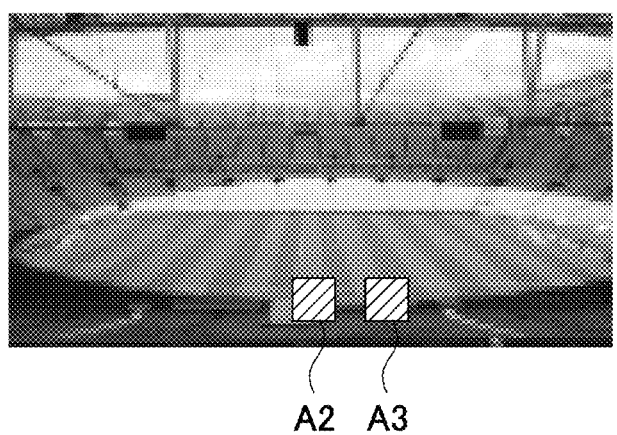
FIG. 10B is a diagram showing restored video of the reception channel 3 in relation to FIG. 9.

Further, since the processor 22 actually performs the restoration processing for restoring the video data to which the change corresponding to the channel 3 is given to the video data of the channel 1, to the video data before the change, a new change is given by restoration processing on the video data of the specific areas A2 and A3 of the channel 1 that has not been changed as shown in FIG. 10B. Accordingly, the user can know that the video transmission interface 21-3 to which the channel 3 on the reception side is allocated and the video transmission interface 13-1 to which the channel 1 on the transmission side is allocated are erroneously connected to each other.

[Reversible Method 1 of Changing Video Data]

Figure 11:
FIG. 11 is a diagram for describing a reversible method 1 of changing video data.

Examples of the method of reversibly changing a specific area in a frame of video data include a method of interchanging the value of the brightness component and the value of the color component in the video data as shown in FIG. 11, for example.

In accordance with this method, the processor 12 of the video transmission apparatus 10 replaces the value of the brightness component and the value of the color component in the video data at the specific position corresponding to the channel with each other to change the video data of the specific area, and the processor 22 of the video reception apparatus 20 replaces the value of the brightness component and the value of the color component in the video data at the specific position corresponding to the channel with each other again, thereby making it possible to restore the video data of the specific area to the video data before the change.

Since simple change processing and restoration processing are enough to replace the value of the brightness component and the value of the color component in the video data with each other as described above, the processing time for changing and restoring the video data can be reduced. Note that since only the value of the brightness component and the value of the color component in the video data are replaced with each other, no prohibition code is generated in the video transmission interface.

[Reversible Method 2 for Changing Video Data]

Examples of another method of reversibly changing a specific area in a frame of video data include a method of inverting the value of a specific bit of one or more digits of a word (e.g., 10 bits) indicating the value of the brightness component.

Figure 12:
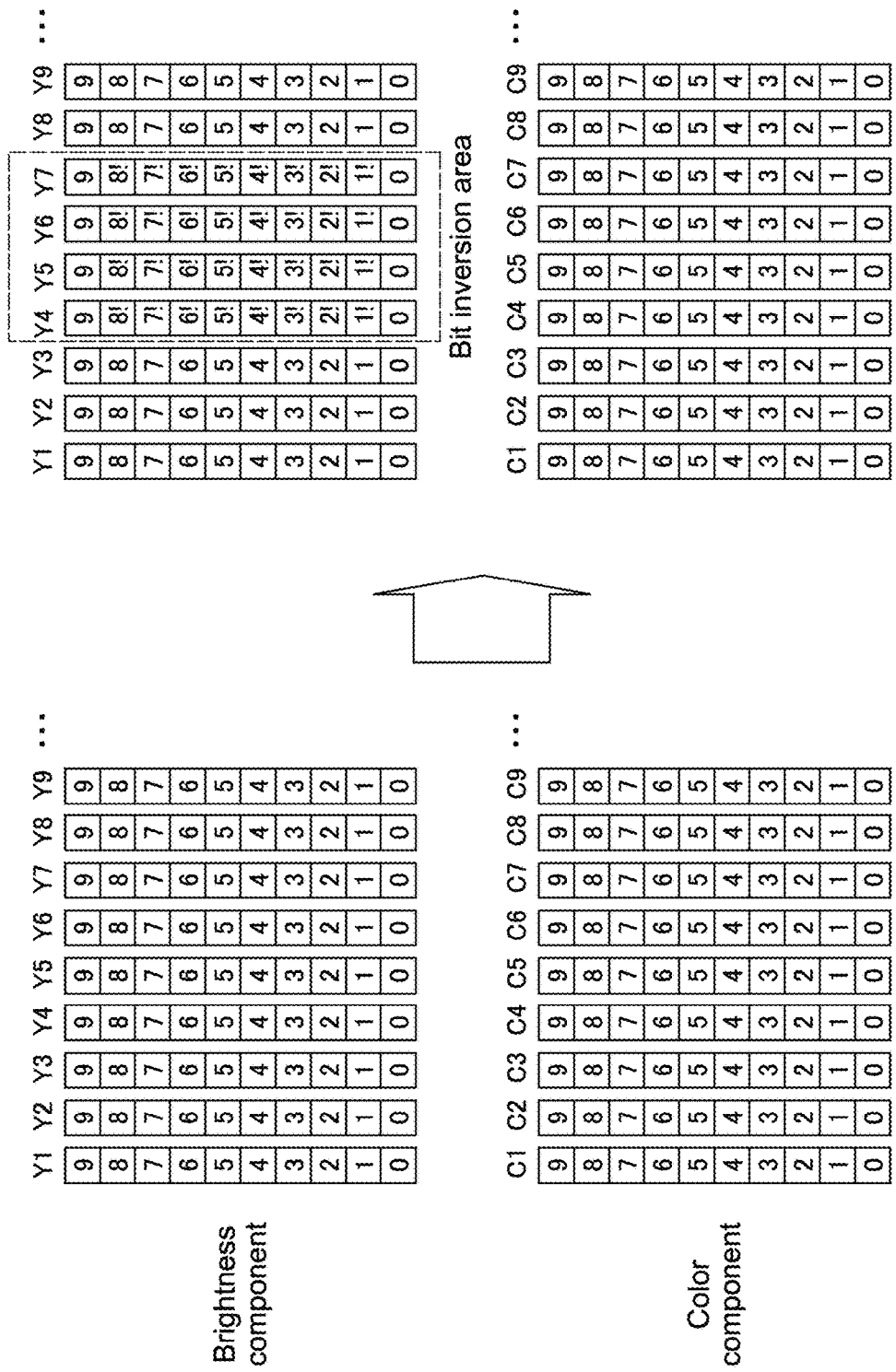
FIG. 12 is a diagram for describing a reversible method 2 of changing video data.

FIG. 12 is a diagram describing this change method.

This is an example of inverting each bit from the second digit to the ninth digit of 10 bits constituting a word indicating the value of the brightness component. For example, the 10 bits of "0111101010" is changed to "0000010100". That is, it is changed from "490" to "21" in decimal number. Also with this method, it is possible to reversibly change a specific area in a frame of video data. Note that in the case where a prohibition code corresponding to the kind of the video transmission interface 13 is generated by this method, it only needs to skip the change of the part where the prohibition code occurs.

[Switching Reversible Change Method]

Since the above-mentioned reversible method 1 of changing the video data merely replaces the brightness component and the color component of the video data with each other, no arithmetic processing occurs and there is an advantage that no prohibition code is generated. However, in the case where the values of the brightness component and the color component are close to each other, an effective change cannot be given to the video data. Meanwhile, in the reversible method 2 of changing the video data, since the bit inversion processing occurs, the processing load is larger than that in the change method 1. However, in the change method 2, since at least one digit carry/borrow occurs due to the inversion processing, an effective change can be given to the video data as compared with the change method 1.

In view of the above, it is effective to adaptively switch the above-mentioned two kinds of change methods.

The processor 12 of the video transmission apparatus 10 replaces the brightness component and the color component of the video data with each other in accordance with the change method 1 with respect to each of one or more pixels at a specific position in the specific area in the frame of the video data. The processor 12 calculates the difference of the values of the luminance component and the color component between the original value of the pixel and the replaced value of the pixel. Then, the processor 12 calculates the average value of the differences calculated for each of the one or more pixels, and determines whether or not this average value exceeds a specific threshold value.

In the case where the average value exceeds the specific threshold value, the processor 12 determines to enable the change method 1, i.e., the method of changing the specific area by interchanging the value of the brightness component and the value of the color component of the video data, and instructs the processor 22 of the video reception apparatus 20 to enable the change method.

Further, in the case where the average value does not exceed the specific threshold value, since the change method 1 is expected to be unable to give an effective change to video data, the processor 12 determines to enable the change method 2, i.e., the method of inverting the value of a specific bit of one or more digits of a word representing the value of the brightness component, and instructs the processor 22 of the video reception apparatus 20 to enable the change method.

In this way, in this video transmission system 1, the visibility of the specific area to which the change is given in the video data can be more stabilized by switching to a more appropriate change method depending on the video data.

[Method of Giving Change to Video Data of Specific Area at Position Corresponding to Channel]

In the above, the video transmission system 1 employing the method of giving a change to video data of a specific area has been described, the number of specific areas corresponding to a channel. However, examples of another method include a method of giving a change to video data of a specific area at a position corresponding to a channel.

In this method, in the three specific areas A1, A2, and A3 shown in FIG. 13, the specific area A1 is associated with the channel 1, the specific area A2 is associated with the channel 2, and the specific area A3 is associated with the channel 3.

The processor 12 of the video transmission apparatus 10 gives, with respect to the video data of the channel 1, a change to the video data of the specific area A1. Similarly, the processor 12 of the video transmission apparatus 10 gives, with respect to the video data of the channel 2, a change to the video data of the specific area A2. Similarly, the processor 12 of the video transmission apparatus 10 gives, with respect to the video data of the channel 3, a change to the video data of the specific area A3 allocated to the channel 3.

Meanwhile, the processor 22 of the video reception apparatus 20 performs, with respect to the video data received by the video transmission interface 21-1 to which the channel 1 is allocated, restoration processing for restoring the video data to which the change corresponding to the channel 1 is given, to the video data before the change. Similarly, the processor 22 of the video reception apparatus 20 performs, with respect to the video data received by the video transmission interface 21-2 to which the channel 2 is allocated, restoration processing for restoring the video data to which the change corresponding to the channel 2 is given, to the video data before the change. Similarly, the processor 22 of the video reception apparatus 20 performs, with respect to the video data received by the video transmission interface 21-3 to which the channel 3 is allocated, restoration processing for restoring the video data to which the change corresponding to the channel 3 is given, to the video data before the change.

Note that in the case where the three video transmission interfaces 13-1, 13-2, and 13-3 of the video transmission apparatus 10 and the three video transmission interfaces 21-1, 21-2, and 21-3 of the video reception apparatus 20 to which the common channels are allocated are connected to each other via the cables 2-1, 2-2, and 2-3, the video data of each channel is restored to the video data before the change by the restoration processing corresponding to the channel for the video data of each channel. This allows the user to confirm that the cable connection of all the channels is correct.

Figure 14A:
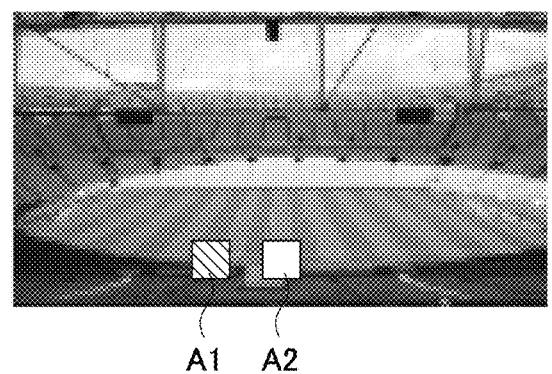
FIG. 14A is a diagram showing restored video of the reception channel 1 in the case where a method of giving a change to video data of a specific area at a position corresponding to a channel is employed and the channel 1 and the channel 2 are replaced with each other and connected to each other.

In the case where the channel 1 and the channel 2 are replaced with each other and connected to each other as shown in FIG. 5, since the processor 22 of the video reception apparatus 20 actually performs restoration processing for restoring the video data to which the change corresponding to the channel 1 is given to the video data of the channel 2 to the video data before the change, the changed video data of the specific area A2 remains as it is even after the restoration processing and a new change is given by restoration processing on the video data of the specific area A1 of the channel 2 that has not been changed as shown in FIG. 14A. This allows the user to know that the video transmission interface 21-1 to which the channel 1 on the reception side is allocated and the video transmission interface 13-2 to which the channel 2 on the transmission side is allocated are erroneously connected to each other.

Figure 14B:
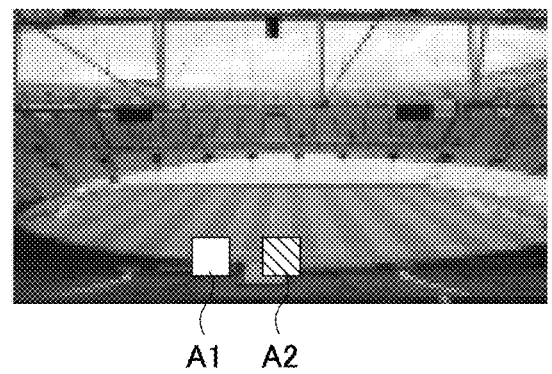
FIG. 14B is a diagram showing restored video of the reception channel 2 as well.

Similarly, since the processor 22 of the video reception apparatus 20 actually performs restoration processing for restoring the video data to which the change corresponding to the channel 2 is given to the video data of the channel 1 to the video data before the change, the changed video data of the specific area A2 corresponding to the channel 2 remains as it is even after the restoration processing and the result of the restoration processing for the specific area A2 is added to the unchanged video data of the channel 1 as shown in FIG. 14B. This allows the user to know that the video transmission interface 21-2 to which the channel 2 on the reception side is allocated and the video transmission interface 13-1 to which the channel 1 on the transmission side is allocated are erroneously connected to each other.

Similarly, in the case where the channel 1 and the channel 3 are replaced with each other and connected to each other and also in the case where the channel 2 and the channel 3 are replaced with each other and connected to each other, the video data cannot be correctly restored to the video data before the change, and the user can know the error state of the cable connection.

[Method of Giving Change to Video Data of Specific Area Having Shape Corresponding to Channel]

Figure 15:
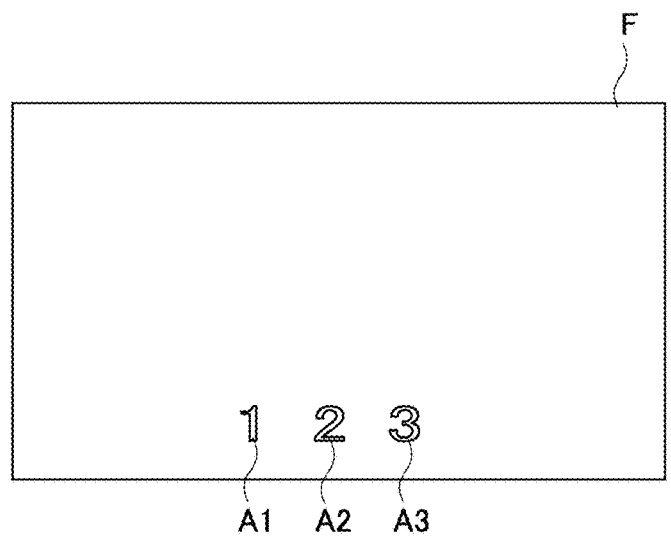
FIG. 15 is a diagram for describing a method of giving a change to video data of a specific area in a shape corresponding to a channel.

In this method, as shown in FIG. 15, for example, the specific areas A1, A2, and A3 for each channel on which a change is given to the video data are made into a shape such as a number indicating a channel number by which the channel can be uniquely identified. Note that the shapes of the specific areas A1, A2, and A3 are not necessarily numbers, and may be shapes such as other characters and marks by which the channel can be uniquely identified.

The processor 12 of the video transmission apparatus 10 gives, with respect to the video data of the channel 1, a change to the video data of the specific area A1 having the numeral shape of "1". Similarly, the processor 12 of the video transmission apparatus 10 gives, with respect to the video data of the channel 2, a change to the video data of the specific area A2 having the numeral shape of "2" allocated to the channel 2. Similarly, the processor 12 of the video transmission apparatus 10 gives, with respect to the video data of the channel 3, a change to the video data of the specific area A3 having the numeral shape of "3" allocated to the channel 3.

Meanwhile, the processor 22 of the video reception apparatus 20 performs, with respect to the video data received by the video transmission interface 21-1 to which the channel 1 is allocated, restoration processing for restoring the video data to which the change corresponding to the channel 1 is given, to the video data before the change. Similarly, the processor 22 of the video reception apparatus 20 performs, with respect to the video data received by the video transmission interface 21-2 to which the channel 2 is allocated, restoration processing for restoring the video data to which the change corresponding to the channel 2 is given, to the video data before the change. Similarly, the processor 22 of the video reception apparatus 20 performs, with respect to the video data received by the video transmission interface 21-3 to which the channel 3 is allocated, restoration processing for restoring the video data to which the change corresponding to the channel 3 is given, to the video data before the change.

Note that in the case where the three video transmission interfaces 13-1, 13-2, and 13-3 of the video transmission apparatus 10 and the three video transmission interfaces 21-1, 21-2, and 21-3 of the video reception apparatus 20 to which the common channels are allocated are connected to each other via the cables 2-1, 2-2, and 2-3, the video data of each channel is restored to the video data before the change by the restoration processing corresponding to the channel for the video data of each channel. This allows the user to confirm that the cable connection of all the channels is correct.

Figure 16A:
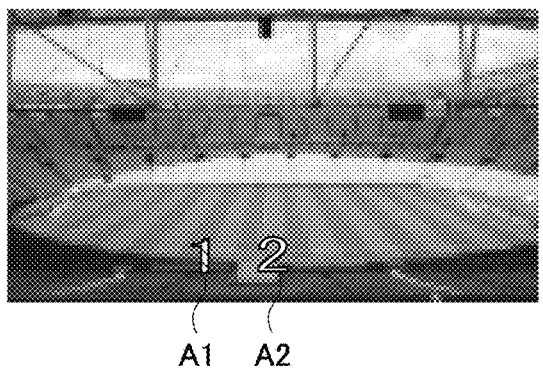
FIG. 16A is a diagram showing restored video of the reception channel 1 in the case where a method of giving a change to video data of a specific area at a position corresponding to a channel is employed and the channel 1 and the channel 2 are replaced with each other and connected to each other.

In the case where the channel 1 and the channel 2 are replaced with each other and connected to each other as shown in FIG. 5, since the processor 22 of the video reception apparatus 20 performs restoration processing for restoring the video data to which the change corresponding to the channel 1 is given to the video data of the channel 2 to the video data before the change, the changed video data of the specific area A2 remains as it is even after the restoration processing and a new change is given by restoration processing on the video data of the specific area A1 of the channel 2 that has not been changed as shown in FIG. 16A. This allows the user to know that the video transmission interface 21-1 to which the channel 1 on the reception side is allocated and the video transmission interface 13-2 to which the channel 2 on the transmission side is allocated are erroneously connected to each other.

Figure 16B:
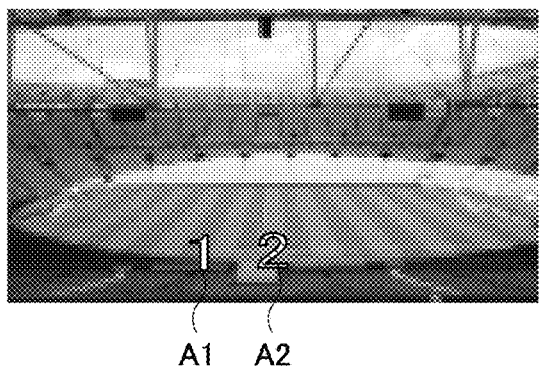
FIG. 16B is a diagram showing restored video of the reception channel 2 as well.

Similarly, since the processor 22 of the video reception apparatus 20 performs restoration processing for restoring the video data to which the change corresponding to the channel 2 is given to the video data of the channel 1 to the video data before the change, the changed video data of the specific area A2 corresponding to the channel 2 remains as it is even after the restoration processing and the result of the restoration processing on the specific area A2 is added to the video data of the channel 1 that has not been changed as shown in FIG. 16B. This allows the user to know that the video transmission interface 21-2 to which the channel 2 on the reception side is allocated and the video transmission interface 13-1 to which the channel 1 on the transmission side is allocated are erroneously connected to each other.

Similarly, in the case where the channel 1 and the channel 3 are replaced with each other and connected to each other and also in the case where the channel 2 and the channel 3 are replaced with each other and connected to each other, the video data cannot be correctly restored to the video data before the change, and the user can know the error state of the cable connection.

Modified Example 1

In the above, the case where the video data of the first frame rate is distributed to N channels one frame at a time in the order of frame number and transmitted at the second frame rate of 1/N of the first frame rate has been described. However, the present technology is applicable to a case where the video data of the first frame rate is distributed to N channels one frame at a time in the order of frame number and transmitted at the first frame rate to reduce the transmission time.

It should be noted that the present technology may take the following configurations.

(1) A video transmission apparatus, including:
   a first control unit that
   divides video data into a plurality of channels in units of one or more specified number of consecutive frames, and
   gives a change by a reversible method to the video data of a specific area in the frame of the video data of each channel, the specific area corresponding to the channel; and
   a plurality of first video transmission interfaces that each transmit the video data of each channel to which the change is given.

(2) The video transmission apparatus according to (1) above, in which
   the first control unit is configured to
   divide the video data of a first frame rate into a plurality of channels in units of one or more specified number of consecutive frames, and
   cause the plurality of first video transmission interfaces to transmit the video data of each channel to which the change is given at a second frame rate obtained by dividing the first frame rate by the number of the channels.

(3) The video transmission apparatus according to (1) or (2) above, in which
   the plurality of first video transmission interfaces are each configured to transmit the video data of each channel to a reception apparatus as a transmission destination via each of a plurality of cables.

(4) The video transmission apparatus according to any one of (1) to (3) above, in which
   the first control unit is configured to give the change by the reversible method to the video data of the specific area by replacing a value of a brightness component and a value of a color component in the video data of the specific area with each other.

(5) The video transmission apparatus according to any one of (1) to (3), in which
   the first control unit is configured to give the change by the reversible method to the video data of the specific area by inverting a value of a specific bit of one or more digits of a word indicating a value of a brightness component in the video data of the specific area.

(6) The video transmission apparatus according to any one of (1) to (3) above, in which
   the first control unit is configured to
   calculate, by replacing a value of a brightness component and a value of a color component of a pixel of one or more specific areas in the video data of the specific area with each other, a difference between an original value of the pixel and the replaced value of the pixel,
   give, where the difference exceeds a specific threshold value, the change by the reversible method to the video data of the specific area by replacing a value of a brightness component and a value of a color component in the video data of the specific area with each other, and
   give, where the difference does not exceed the specific threshold value, the change by the reversible method to the video data of the specific area by inverting a value of a specific bit of one or more digits of a word indicating the value of the brightness component in the video data of the specific area.

(7) The video transmission apparatus according to any one of (1) to (6), in which
   the first control unit is configured to give a change to the video data of the specific area, the number of specific areas corresponding to the channel.

(8) The video transmission apparatus according to any one of (1) to (6), in which
   the first control unit is configured to give a change to the video data of the specific area at a position corresponding to the channel.

(9) The video transmission apparatus according to any one of (1) to (6), in which the first control unit is configured to give a change to the video data of the specific area having a shape corresponding to the channel.

REFERENCE SIGNS LIST 1 video transmission system
10 video transmission apparatus
11 video data acquisition unit
12 processor
13-1, 13-2, . . . , 13-N video transmission interface
20 video reception apparatus
21-1, 21-2, . . . , 21-N video transmission interface
22 processor

The invention claimed is:

1. A video transmission apparatus, comprising:
a processor configured to:
  divide video data into a plurality of channels in units of one or more specified number of consecutive frames; and
  change, by a reversible method, the video data of a specific area in a frame of the video data of each channel of the plurality of channels, wherein the specific area has a shape that indicates a channel number of a channel of the plurality of channels; and
a plurality of video transmission interfaces,
  wherein each video transmission interface of the plurality of video transmission interfaces is configured to transmit the video data of each channel of the plurality of channels which is changed.

2. The video transmission apparatus according to claim 1, wherein the processor is further configured to:
  divide the video data of a first frame rate into the plurality of channels in the units of the one or more specified number of consecutive frames; and
  control the plurality of video transmission interfaces to transmit the video data of each channel which is changed at a second frame rate obtained by dividing the first frame rate by a number of the plurality of channels greater than or equal to 2.

3. The video transmission apparatus according to claim 1, wherein
  each video transmission interface of the plurality of video transmission interfaces is further configured to transmit the video data of each channel to a reception apparatus as a transmission destination, and
  the video data is transmitted via each cable of a plurality of cables.

4. The video transmission apparatus according to claim 1, wherein the processor is further configured to change the video data of the specific area based on replacement of a value of a brightness component and a value of a color component in the video data of the specific area with each other.

5. The video transmission apparatus according to claim 1, wherein
  the processor is further configured to change the video data of the specific area based on inversion of a value of a specific bit of one or more digits of a word, and
  the specific bit indicates a value of a brightness component in the video data of the specific area.

6. The video transmission apparatus according to claim 1, wherein the processor is further configured to:
  replace a value of a brightness component and a value of a color component of one or more pixels at one or more specific positions in the video data of the specific area with each other;
  calculate a difference between an original value of a pixel of the one or pixels and the replaced value of the pixel;
  based on the difference exceeding a specific threshold value, change, by the reversible method, the video data of the specific area based on replacement of the value of the brightness component and the value of a color component in the video data of the specific area with each other; and
  based on the difference being less than the specific threshold value, change, by the reversible method, the video data of the specific area based on inversion of a value of a specific bit of one or more digits of a word,
  wherein the specific bit indicates the value of the brightness component in the video data of the specific area.

7. The video transmission apparatus according to claim 1, wherein the processor is further configured to change the video data of a number of specific areas corresponding to the channel number of the channel of the plurality of channels.

8. The video transmission apparatus according to claim 1, wherein the processor is further configured to change the video data of the specific area at a position corresponding to the channel number of the channel of the plurality of channels.

9. A video reception apparatus, comprising:
a plurality of second video transmission interfaces, wherein
  each second video transmission interface of the plurality of second video transmission interfaces is configured to receive video data of a corresponding channel of a plurality of channels from a video transmission apparatus,
  the video transmission apparatus divides the video data into the plurality of channels in units of one or more specified number of consecutive frames, and changes, by a reversible method, the video data of a specific area in a frame of the video data of each channel of the plurality of channels,
  the specific area has a shape that indicates a channel number of a channel of the plurality of channels, and
  the video transmission apparatus transmits, via a plurality of first video transmission interfaces of the video transmission apparatus, the video data of each channel of the plurality of channels which is changed; and
a processor configured to:
  allocate the channel of the plurality of channels to a second video transmission interface of the plurality of second video transmission interfaces; and
  restore the received video data of the specific area which is changed to the video data before the change,
  wherein the received video data is restored corresponding to the channel allocated to the second video transmission interface that received the video data.

10. A video transmission method, comprising:
dividing, by a processor, video data into a plurality of channels in units of one or more specified number of consecutive frames;
changing, by the processor, the video data of a specific area in a frame of the video data of each channel of the plurality of channels, wherein
  the video data of the specific area is changed based on a reversible method, and
  the specific area has a shape indicating a channel number of a channel of the plurality of channels; and
transmitting, by a plurality of video transmission interfaces, the video data of each channel of the plurality of channels which is changed.

11. A video transmission method, comprising:
dividing, by a first processor of a video transmission apparatus, video data into a plurality of channels in units of one or more specified number of consecutive frames;
changing, by the first processor, the video data of a specific area in a frame of the video data of each channel of the plurality of channels, wherein
the video data of the specific area is changed based on a reversible method, and
the specific area has a shape indicating a channel number of a channel of the plurality of channels;
transmitting, by a plurality of first video transmission interfaces, the video data of each channel of the plurality of channels which is changed;
allocating, by a second processor of a video reception apparatus, the channel of the plurality of channels to a second video transmission interface of a plurality of second video transmission interfaces; and
restoring, by the second processor, the video data of the specific area which is changed to the video data before the change,
wherein the video data is restored corresponding to the channel allocated to the second video transmission interface that received the video data.

12. A video transmission system, comprising:
a video transmission apparatus including:
a first processor configured to:
divide video data into a plurality of channels in units of one or more specified number of consecutive frames; and
change, by a reversible method, the video data of a specific area in a frame of the video data of each channel of the plurality of channels; and
a plurality of first video transmission interfaces, wherein the specific area has a shape that indicates a channel number of a channel of the plurality of channels,
wherein each video transmission interface of the first plurality of video transmission interfaces is configured to transmit the video data of each channel of the plurality of channels which is changed; and
a video reception apparatus including:
a plurality of second video transmission interfaces,
wherein each second video transmission interface of the plurality of second video transmission interfaces is configured to receive, from the video transmission apparatus, the video data of each channel of the plurality of channels which is changed; and
a second processor configured to:
allocate the channel of the plurality of channels to a second video transmission interface of the plurality of second video transmission interfaces; and
restore the received video data of the specific area which is changed to the video data before the change,
wherein the received video data is restored corresponding to the channel allocated to the second video transmission interface that received the video data.

* * * * *